United States Patent [19]

Solarek et al.

[11] Patent Number: 4,804,769

[45] Date of Patent: Feb. 14, 1989

[54] ACETALS USEFUL FOR THE PREPARATION OF POLYSACCHARIDE DERIVATIVES

[75] Inventors: Daniel B. Solarek, Somerville; Patrick G. Jobe, Westfield; Martin M. Tessler, Edison; Robert L. Billmers, Stockton; Diane J. Lamb, Bound Brook; John J. Tsai, Belle Mead, all of N.J.

[73] Assignee: National Starch and Chemical Corporation, Bridgewater, N.J.

[21] Appl. No.: 37,282

[22] Filed: Apr. 10, 1987

Related U.S. Application Data

[60] Division of Ser. No. 829,675, Feb. 14, 1986, Pat. No. 4,703,116, which is a continuation-in-part of Ser. No. 758,634, Jul. 24, 1985, Pat. No. 4,675,394, which is a continuation-in-part of Ser. No. 641,820, Aug. 17, 1984, abandoned.

[51] Int. Cl.$^4$ .......................................... C07D 319/06
[52] U.S. Cl. ...................................................... 549/374
[58] Field of Search ......................................... 549/374

[56] References Cited

U.S. PATENT DOCUMENTS

| 2,698,937 | 1/1955 | Staerkle et al. | 536/104 X |
| 3,519,618 | 7/1970 | Parmerter | 536/104 |
| 4,048,435 | 9/1977 | Rutenberg et al. | 536/104 X |
| 4,276,414 | 6/1981 | Tessler | 536/120 X |

FOREIGN PATENT DOCUMENTS

| 0153501 | 4/1985 | European Pat. Off. | 536/114 |
| 0667793 | 11/1938 | Fed. Rep. of Germany | 549/374 |

Primary Examiner—John W. Rollins
Assistant Examiner—Wendy B. Davis
Attorney, Agent, or Firm—Margaret B. Kelley; Edwin M. Szala

[57] ABSTRACT

Polysaccharide aldehydes having the formula Sacch-O-CH$_2$-CH=CH-CHO, Sacch-O-CH$_2$-C≡C-CHO,

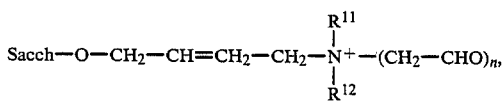

-continued

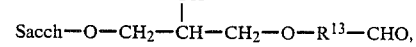

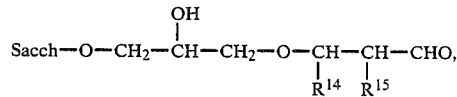

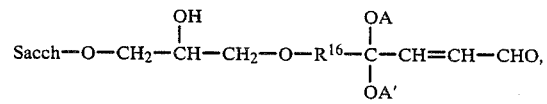

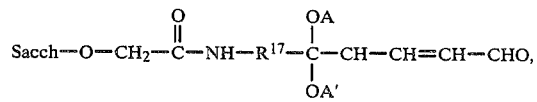

and

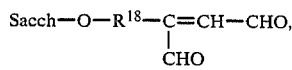

such as starch, cellulose, and gum aldehydes, are useful for imparting wet, dry, or temporary wet strength to paper. They are prepared by a non-oxidative method which involves reacting the polysaccharide base, in the presence of alkali, with a derivatizing acetal reagent having the general structure

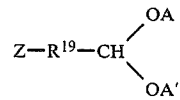

and then hydrolyzing the acetal by adjusting the pH to less than 7, preferably 2–4. In the formulas, n is 1–3; $R^{11}$ and $R^{12}$ are independently an alkyl, aryl, aralkyl, or alkaryl group when n is 1, $R^{11}$ or $R^{12}$ is one of the groups when n is 2, or $R^{11}$ and $R^{12}$ are not present when n is 3; $R^{13}$ is an alkyl group, optionally containing an ether linkage, or an aralkyl group; $R^{14}$ and $R^{15}$ are individually a hydrogen or a methyl group; $R^{16}$, $R^{17}$, and $R^{18}$ are individually an alkyl group; $Y^-$ is an anion; Z is an organic group capable of reacting with the polysaccharide base to form an ether derivative and selected from the group consisting of an epoxide, ethylenically unsaturated group, halohydrin, and halogen; $R^{19}$, if present, is a divalent organic group containing no reactive substituents; and A and A' are lower alkyls or together form at least a 5-membered cyclic acetal.

13 Claims, No Drawings

ACETALS USEFUL FOR THE PREPARATION OF POLYSACCHARIDE DERIVATIVES

This application is a division of application Ser. No. 829,675, filed Feb. 14, 1986, now U.S. Pat. No. 4,703,116, issued 10-27-87, which is a continuation-in-part of Ser. No. 758,634 filed July 24, 1985, now U.S. Pat. No. 4,675,394 issued June 23, 1987, which is a continuation-in-part of Ser. No. 641,820 filed Aug. 17, 1984, now abandoned.

BACKGROUND OF THE INVENTION

The present invention relates to polysaccharide derivatives containing aldehyde groups and to the acetal derivatives used in the preparation thereof. It also relates to a non-oxidative process for introducing aldehyde groups into polysaccharides. It further relates to the use of the cationic aldehyde-containing derivatives as paper additives.

As used herein, the term "paper" includes sheet-like masses and molded products made from fibrous cellulosic materials which may be derived from natural sources as well as from synthetics such as polyamides, polyesters, and polyacrylic resins, and from material fibers such as asbestos and glass. In addition, papers, made from combinations of cellulosic and synthetic materials are applicable herein. Paperboard is also included within the broad term "paper".

Oxidative and non-oxidative methods have been used to introduce aldehyde groups into polysaccharides such as starches, gums, and celluloses. The oxidative methods used have included treatment with periodic acid, periodates, or alkali metal ferrates. See U.S. Pat. No. 3,086,969 (issued Apr. 23, 1963 to J. E. Slager) which discloses an improved process for the preparation of a dialdehyde polysaccharide (e.g., starch) using periodic acid; U.S. Pat. No. 3,062,652 (issued Nov. 6, 1962 to R. A. Jeffreys et al.) which discloses the preparation of dialdehyde gums (e.g., gum acacia, pectin, and guar) using periodate or periodic acid; and U.S. Pat. No. 3,632,802 (issued Jan. 4, 1972 to J. N. BeMiller et al.) which discloses a method for oxidizing a carbohydrate (e.g., starch or cellulose) with an alkali metal ferrate.

In the above methods the aldehyde groups are formed by the oxidation of the hydroxyl groups on the ring and/or side chain. Treatment with periodic acid or periodate selectively oxidizes the adjacent secondary hydroxyl groups on the ring carbon atoms (e.g., the 2,3-glycol structures), cleaves the ring, and results in a "so-called" dialdehyde derivative which is principally a hydrated hemialdal and intra- and intermolecular hemiacetals. Treatment of carbohydrates with alkali metal ferrates selectively oxidizes the primary alcohol group on the side chains without ring cleavage or oxidation of the ring hydroxyls.

The disadvantages of the oxidative method include degradation to lower molecular weight products and the formation of carboxyl groups due to further oxidation of the aldehyde groups. U.S. Pat. No. 3,553,193 (issued Jan. 5, 1973 to D. H. LeRoy et al.) describes a method for oxidizing starch using an alkali metal bromite or hypobromite under carefully controlled conditions. The resulting dialdehyde is reported to have a substantially greater proportion of carbonyl groups (i.e., aldehyde groups) than carboxyl groups. It also discloses a method for selectively oxidizing the side chains of starch derivatives (e.g., an alkoxylated starch such as dihydroxypropyl starch) under the same process conditions whereby the underivatized starch hydroxy groups on the rings are substantially non-oxidized.

The presence of carboxylic groups in aldehyde starches has several disadvantages in addition to the obvious reduction in the degree of aldehyde substitution. These include the introduction of hydrophilic properties due to the carboxyl groups, an upset in the cationic/anionic ratio when a cationic starch base is used (as in most papermaking wet end uses), and the possible formation of salts (in the above paper-making end use) which could give rise to ionic crosslinking.

The non-oxidative methods typically involve the reaction of the polysaccharide with an aldehyde-containing reagent. See U.S. Pat. No. 3,519,618 (issued July 7, 1970 to S. M. Parmerter) and U.S. Pat. No. 3,740,391 (issued June 19, 1973 to L. L. Williams et al.) which cover starch derivatives and U.S. Pat. No. 2,803,558 (issued Aug. 20, 1957 to G. D. Fronmuller) which covers a gum derivative. The starch derivative of Parmerter is prepared by reaction with an unsaturated aldehyde (e.g. acrolein) and has the structure Starch-O-CH($R^1$)-CH($R^2$)-CHO where $R^1$ and $R^2$ are hydrogen, lower alkyls or halogen. The starch derivative of Williams is prepared by reaction with acrylamide followed by reaction with glyoxal and has the structure

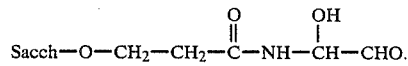

The gum derivative of Fronmuller is prepared by treating the dry gum (e.g., locust bean or guar gum) with peracetic acid to reduce the viscosity, neutralizing, and then reacting with glyoxal. Water-soluble cellulose ethers (e.g., hydroxyethylcellulose) have also been reacted with glyoxal or ureaformaldehyde to give aldehyde-containing derivatives.

One of the disadvantages of introducing the aldehyde groups directly using an aldehyde-containing reagent is the possibility of the derivative crosslinking prior to use. This is a particular disadvantage when the products are being used to impart temporary wet strength to paper via a crosslinking reaction with the cellulose fibers. The Williams patent (cited above) alludes to this problem when it notes that solutions of the glyoxalated polymers "are stable for at least a week when diluted to 10% solids by weight and adjusted to pH 3" (see Col. 3, lines 60-63). The Parmerter patent notes that the starch aldehyde is "a substantially non-crosslinked granular starch derivative" and discusses the importance of the non-crosslinked character (see Col. 2, lines 40-45).

Therefore there is a need for aldehyde-containing polysaccharide derivatives and an improved non-oxidative method for their preparation which does not crosslink the derivative.

SUMMARY OF THE INVENTION

The present invention discloses polysaccharide aldehyde derivatives which have the formula

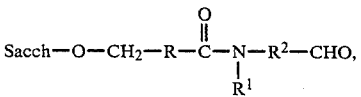

-continued

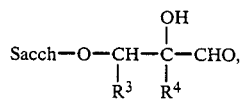

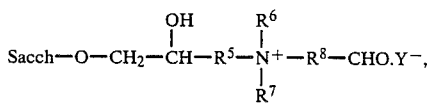

as well as polysaccharide acetals which have the formula

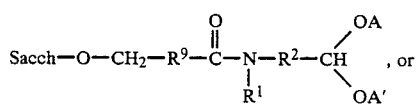

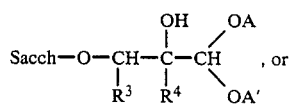

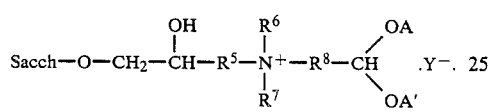

The preparation of the above aldehyde and acetals is described in Ser. No. 641,820 filed Aug. 17, 1984, the disclosure of which is incorporated herein by reference.

The present invention provides the following novel aldehyde-containing polysaccharide derivatives, as well as the corresponding acetal-containing polysaccharide derivatives.

1. An aldehyde-containing polysaccharide derivative which has the formula Sacch-O-CH$_2$-CH=CH-CHO, as well as an acetal-containing polysaccharide derivative which has the formula

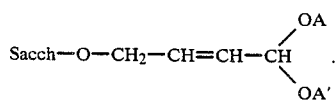

2. An aldehyde-containing polysaccharide derivative which has the formula Sacch-O-CH$_2$-C≡C-CHO and an acetal-containing polysaccharide derivative which has the formula

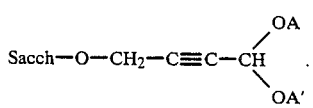

3. An aldehyde-containing polysaccharide derivative which has the formula

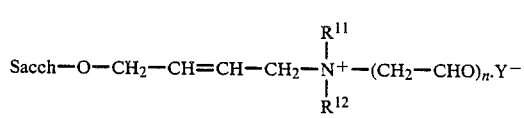

and an acetal-containing polysaccharide derivative which has the formula

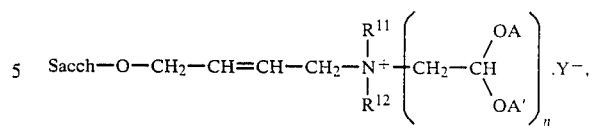

where $n=1$ when both $R^{11}$ and $R^{12}$ are present, $n=2$ when only $R^{11}$ or $R^{12}$ are present, or $n=3$ when neither $R^{11}$ or $R^{12}$ are present.

4. An aldehyde-containing polysaccharide derivative which has the formula

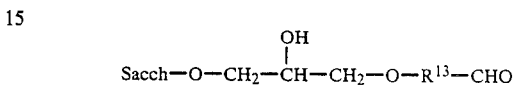

and an acetal-containing polysaccharide derivative which has the formula

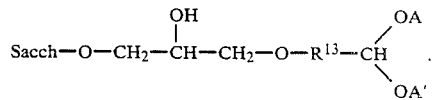

5. An aldehyde-containing polysaccharide derivative which has the formula

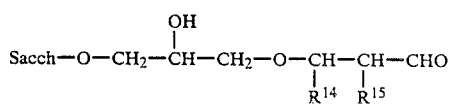

and an acetal-containing polysaccharide derivative which has the formula

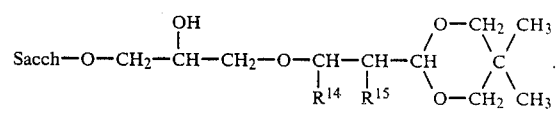

6. An aldehyde-containing polysaccharide derivative which has the formula

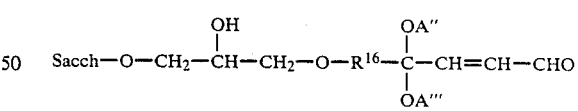

and/or

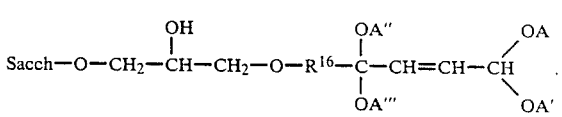

and an acetal-containing polysaccharide derivative which has the formula

Sacch—O—CH$_2$—CH(OH)—CH$_2$—O—R$^{16}$—C(OA")(OA''')—CH=CH—CH(OA)(OA')

7. An aldehyde-containing polysaccharide derivative which has the formula

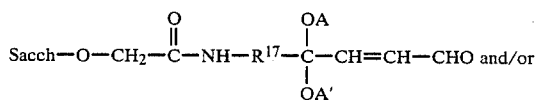

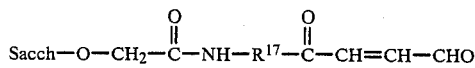

and an acetal-containing polysaccharide derivative which has the formula

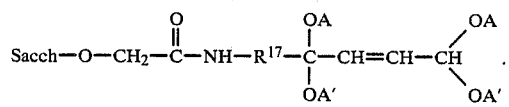

8. An aldehyde-containing polysaccharide derivative which has the formula

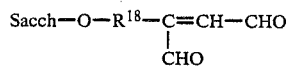

and an acetal-containing polysaccharide which has the formula

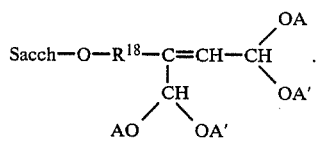

It also provides a polysaccharide aldehyde having the formula Sacch-O-$R^{19}$-CHO prepared by hydrolyzing, at a pH of about 6 or less, a polysaccharide acetal having the formula

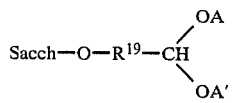

which is prepared by reacting the polysaccharide, at a pH of about 9 or above, with an acetal reagent which does not substantially crosslink or oxidize the polysaccharide during the reaction. The reagent is described hereafter.

In the above formulas Sacch-O— represents a polysaccharide molecule (wherein the hydrogen of a hydroxyl group of a saccharide unit has been replaced as shown); R is $(CH_2)_n$ or a divalent aromatic group and n is zero or greater; $R^9$ is $(CH_2)_n$ or a divalent aromatic group and n is zero or greater, with the proviso that n is 1 or more when the polysaccharide molecule is a starch molecule; $R^1$, $R^6$ and $R^7$ are hydrogen, an alkyl (preferably methyl), aryl, aralkyl, or alkaryl group; $R^2$, $R^5$ and $R^8$ are $(CH_2)_m$ with m being 1-6 (preferably 1-2); $R^3$ and $R^4$ are hydrogen or a lower alkyl, preferably methyl; $R^{11}$ and $R^{12}$ are independently an alkyl, aryl, aralkyl or alkaryl group, preferably a lower alkyl group, most preferably methyl; $R^{13}$ is an alkyl group, optionally containing an ether linkage, or an, aralkyl; $R^{14}$ and $R^{15}$ are individually hydrogen or a methyl group; $R^{16}$, $R^{17}$ and $R^{18}$ are an alkylene, preferably a lower alkyl one, most preferably methylene; $R^{19}$ is divalent organic group containing no starch-reactive substituents; A, A', A'', and R''' are independently a lower alkyl or A and A' together form at least a 5-membered cyclic acetal; and Y is an anion such as a halide, sulfate, or nitrate. The polysaccharide molecule may be modified by the introduction of cationic, anionic, nonionic, amphoteric, and/or zwitterionic substituent groups. As used herein, the terms "cationic" and "anionic" are intended to cover cationogenic and anionogenic groups and the term "reactive substituents" refers to substituents which react with polysaccharide to form a covalent bond.

The aldehydes are prepared by hydrolyzing the corresponding acetal at a pH of less than 7, preferably 5 or less, most preferably 2.0–4.0. The acetals are prepared by reacting the polysaccharide with an acetal reagent having the general structure

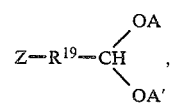

where Z is an organic group capable of reacting with the saccharide molecule to form an ether derivative and selected from the group consisting of an epoxide, a halohydrin, an ethylenically unsaturated group, and a halogen and $R^{19}$, if present, is a divalent organic group containing no reactive substituents.

Typical reagents for preparing the acetal-containing derivatives shown in (1) have the formula

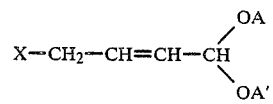

and for preparing the acetal-containing derivatives shown in (2) have the formula

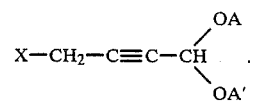

The present invention also provides novel acetal-containing reagents (some of which are cyclic acetals) for preparing the acetal-containing derivatives shown in (3), (4), and (5). The reagents have the following formulas:

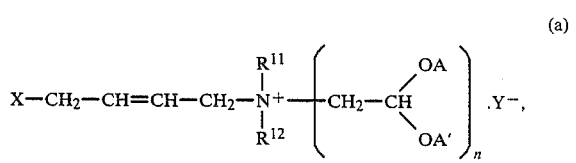

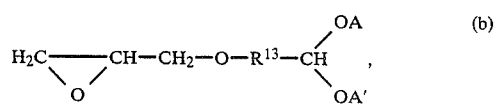

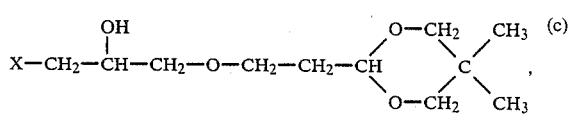

and $R^{11}$, $R^{12}$, A, A' are as defined previously and X is a halogen, preferably chlorine or bromine.

The acetal-containing reagents shown in (a) can be prepared by the conventional reaction of a dihalo butene with the appropriate amine, typically and tertiary amine, in an organic solent. The reaction is described in articles by R. S. Shelton et al. in J. Am. Chem. Soc. 68, 753, 755, 757 (1946), by P. Walden in Z. Elektrochem. 27, 36 (1921), and by C. R. McCrosky et al. in J. Am. Chem. Soc. 62, 2031 (1940).

The acetal-containing reagents, shown in (b) to (c) can be prepared by two methods.

The first method involves converting an alcohol-containing aldeyde (e.g., 3-hydroxy-2,2-dimethylpropionaldehyde,) to the acetal by treatment with an excess of an anhydrous alcohol (e.g., methanol) in the presence of a trace amount of an acid. The acetal is then reacted with an epihalohydrin (e.g., epichlorohydrin) under conditions that will not affect the acetal group (i.e., under alkaline conditions). The epihalohydrin addition is described in an article by R. Pozniak and J. Chlebicki entitled "Synthesis of Higher N-(2-Hydroxy-3-alkoxypropyl)ethanolamines and N-(2-Hydroxy-3-alkoxypropyl)diethanolamines", Polish J. Chem. 52, p. 1283 (1978).

The second method involves the addition of two moles of a diol (e.g., ethylene glycol) to 1 mole of an unsaturated aldehyde (e.g., croton-aldehyde or acrolein) to give an alcohol-containing dioxolane which is then reacted with an epihalohydrin as discussed above. The addition of diols to unsaturated aldehydes is discussed in an article by A. Piasecki entitled "Acetals and Ethers XII. Reaction Products of 2-Butenal with Ethylene Glycol", Tetrahedron 40, p. 4893 (1984).

The addition is reported to produce the acetal and ethoxy ether in one step, as shown below.

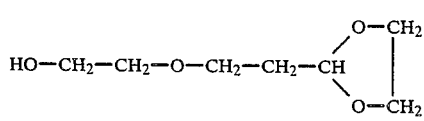

By controlling the reaction conditions (room temperature or slightly above) and choosing a diol that is water-insoluble (e.g., 2,2-dimethyl-1,3-propanediol), the reaction will stop after addition to only the aldehyde. The reaction of acrolein with a diol to form an acetal is described in U.S. Pat. No. 4,108,869 (issued Aug. 22, 1978 to H. B. Copelin). Addition of a halohydrin (e.g., 3-chloro-1,2-propanediol) to the double bond can be accomplished in a 2nd step if catalytic amounts of acid (e.g., p-toluenesulfonic acid) are present and the reaction is carried out with heating in a solvent (e.g., cyclohexane or methyl ethyl ketone). The equations below show the 2-step reaction.

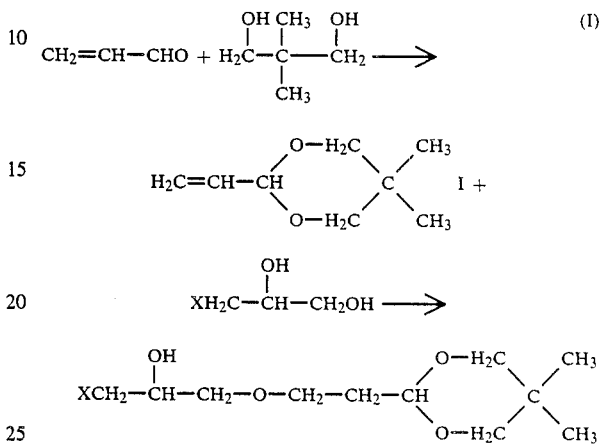

The present invention further provides novel acetal-containing reagents prepared by the ring opening of furans under very mild conditions. The reagents used to prepare the acetals shown in (6) and (7) have the formulas:

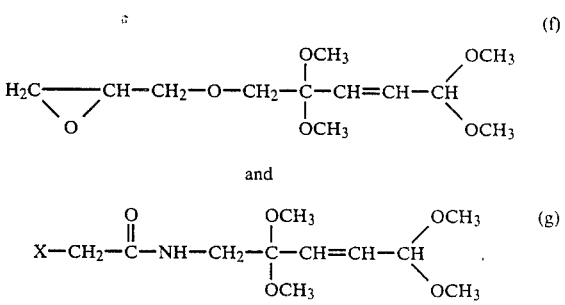

They are prepared from furan derivatives which can be reacted with a reagent capable of introducing a starch reactive group (e.g., an epoxide, halohydrin, or ethylenically unsaturated group) followed by a ring opening reaction to form the acetal. The reactions proceed as follows:

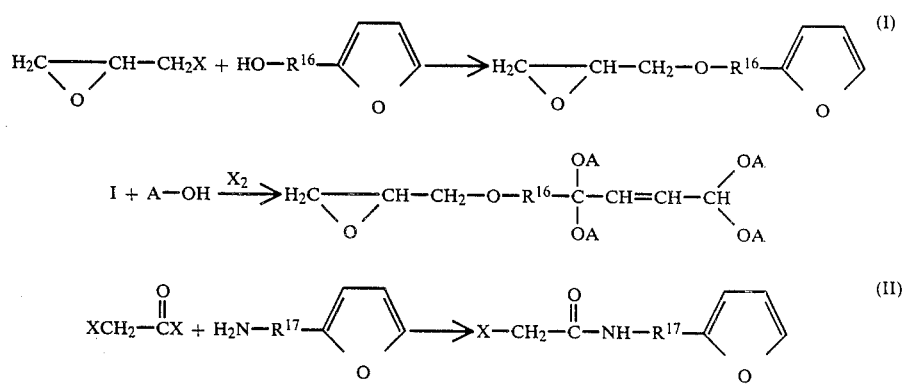

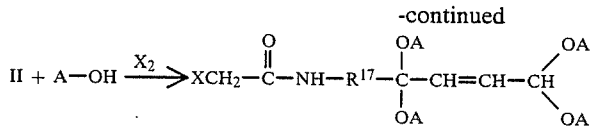

The reagents used to prepare the acetal shown in (8) to have structure

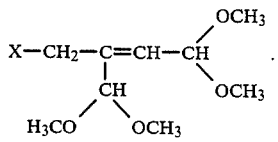   (h)

They are prepared by directly ring opening a furan containing a starch reactive substituent group. The reaction proceeds as follows:

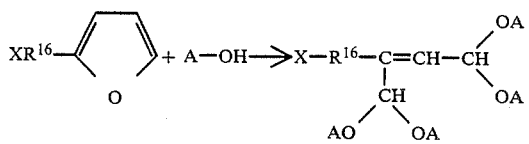

The ring opening reaction using a simple alcohol (e.g., $CH_3OH$) or a diol (e.g., ethylene glycol) is carried out under mild conditions using the procedure described by S. M. Makin and N. I. Telegina in J. Gen. Chem. USSR 32, 1082-87 (1962) and in U.S. Pat. No. 3,240,818 issued Mar. 16, 1966 to D. M. Burness. When the diol is used, a cyclic acetal will result. The use of a mixture of alcohols will result in a mixed acetal and the A groups will be different.

The aldehyde and acetal derivatives are useful in conventional applications where water-soluble or water-swellable polysaccharide derivatives are useful, for example, as coatings, adhesives, and paper and textile additives. Most of the aldehyde-containing derivatives are useful as temporary wet strength additives, for example in tissue/toweling paper stocks, and as wet and dry strength additives for all paper types including liner board. When the aldehydes are prepared from cyclic acetals, five-membered acetal rings are preferred since such rings are easier to hydrolyze than six-membered rings. The more severe conditions required to hydrolyze the six-membered rings lead to degradation of the polysaccharide, and this impairs their efficiency as paper additives.

The derivatives typically contain cationic and cationogenic groups in addition to the aldehyde groups. These include diethylaminoethyl ether groups introduced by reaction with 2-diethylaminochloride hydrochloride or 3-(trimethylammonium chloride)-2-hydroxypropyl ether groups introduced by reaction with 3-chloro-2-hydroxypropyl trimethylammonium chloride. The aldehyde-containing derivatives containing quaternary ammonium groups, i.e.,

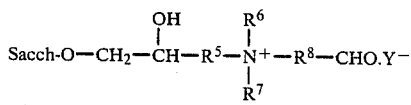

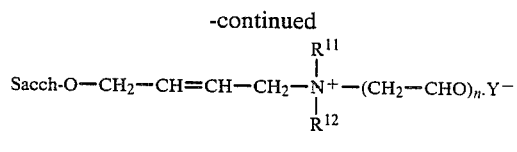

and the aldehyde having the structure

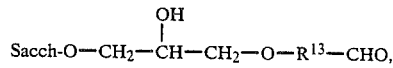

where $R^{13}$ is a difunctional aryl group and the —CHO group is attached directly to the aromatic ring (e.g., Reagent S in Example XI), are not useful as wet paper strength additives. As used herein, the term aromatic ring is intended to include not only conjugated hydrocarbons but also conjugated heterocyclic systems.

DESCRIPTION OF THE PREFERRED EMBODIMENTS

When the polysaccharide is starch, applicable starch bases which may be used herein may be derived from any plant source including corn, potato, sweet potato, wheat, rice, sago, tapioca, waxy maize, sorghum, high amylose corn, or the like. Starch flours may also be used as a starch source. Also included are the conversion products derived from any of the former bases including, for example, dextrins prepared by the hydrolytic action of acid and/or heat; oxidized starches prepared by treatment with oxidants such as sodium hypochlorite; fluidity or thin-boiling starches prepared by enzyme conversion or mild acid hydrolysis; and derivatized and crosslinked starches. The starch base may be a granular starch or a gelatinized starch, i.e. non-granular starch.

When the polysaccharide is gum, applicable bases which may be used herein are polygalactomannans, which are heteropolysacchrides composed principally of long chains of $1\propto 4$ $\beta$-D-mannopyranosyl units to which single unit side chains of $\alpha$-D-galactopyranosyl units are joined by 1→6 linkages and hereafter referred to as "gums". Also included are degraded gum products resulting from the hydrolytic action of acid, heat, shear, and/or enzyme; oxidized gums; and derivatized gums. The preferred gums include gum arabic, as well as guar gum and locust bean gum because of their commercial availability.

When the polysaccharide is cellulose, applicable bases useful herein include cellulose and cellulose derivatives, especially water-soluble cellulose ethers such as alkyl and hydroxyalkylcellulose, specifically methylcellulose, hydroxypropylmethyl cellulose, hydroxybutylmethylcellulose, hydroxyethylmethylcellulose, and ethylhydroxyethylcellulose.

Methods for preparing the modified polysaccharides bases are well-known to those skilled in the art and discussed in the literature. See, for example, R. L. Whistler, Methods in Carbohydrate Chemistry, Vol. IV, 1964, pp. 279-311; R. L. Whistler et al., Starch-Chemistry and Technology, Vol. II, 1967, pp. 293-430; R. L.

Davidson and N. Sittig, Water-Soluble Resins, 2nd Ed., 1968, Chapter 2; and R. L. Davison, Handbook of Water-Soluble Gums and Resins, 1980, Chapters 3, 4, 12 and 13 directed to cellulose derivatives, Chapters 6 and 14 directed to gums, and Chapter 22 directed to starch.

The starch reactions with the derivatizing reagents that introduce the acetal groups are carried out using the general procedure described in U.S. Pat. No. 3,880,832 issued Apr. 29, 1975 to M. M. Tessler. Granular reactions are typically carried out in water at 20°–50° C., preferably about 40°–45° C. Non-granular starch reactions may be carried out at higher temperatures (e.g., up to 100° C.). The reaction mixture is preferably agitated. Reaction time may vary from about 0.5–40 hours, preferably 8–24 hours, for aqueous reactions or from about 1–8 hours for reactions carried out in a substantially dry reaction medium. It will depend on such factors as the amount of reagent employed, the temperature, the scale of the reaction, and the degree of substitution desired. The pH is maintained at about 10–13, preferably 11–12, during the reagent addition and during the entire reaction using a base such as sodium, potassium, or calcium hydroxide. Sodium sulfate is typically added to the reaction mixture to reduce swelling of the granular starch; it is not used when calcium hydroxide is the base. Potassium or sodium iodide is a good catalyst for reacting the chloroacetylated amine derivatives, but it is not necessary for a satisfactory reaction with the starch. After completion of the reaction, the excess alkali is neutralized and the pH is adjusted to about 7–8 using any conventional acid prior to recovery of the starch. If the final pH of the starch derivative is less than about 5–6, the derivatives may crosslink with time and disperse poorly or not at all.

The gum reactions with the acetal reagents are carried out in a two-phase reaction system comprising an aqueous solution of a water-miscible solvent and the water-soluble reagent in contact with the solid gum. The water content may vary from 10 to 60% by weight depending upon the water-miscible solvent selected. If too much water is present in the reaction system, the gum may swell or enter into solution thereby complicating recovery and purification of the derivative. The water-miscible solvent is added in the amount sufficient for the preparation of a slurry which can be agitated and pumped. The weight ratio of water-miscible solvent to gum may vary from 1:1 to 10:1, preferably from 1.5:1 to 5:1. Suitable water-miscible solvents include alkanols, glycols, cyclic and acylic alkyl ethers, alkanones, dialkylformamide and mixtures thereof. Typical solvents include methanol, ethanol, isopropanol, secondary pentanol, ethylene glycol, acetone, methyethylketone, diethylketone, tetrahydrofuran, dioxane, and dimethylformamide. The reaction times and temperatures used for the aqueous reactions are suitable for the solvent reaction.

The cellulose reactions with the acetal reagents are conveniently carried out using the procedure of U.S. Pat. No. 4,129,722 (issued Dec. 12, 1978 to C. P. Iovine et al.). The cellulose or cellulose derivative is suspended in an organic solvent and a water solution of the derivatizing agent is added thereto. Derivatization in the resultant two-phase mixture is ordinarily carried out with agitation at temperatures of 30° to 85° C., adding alkali if necessary to effect reaction. At least one of the initial phases (i.e., the suspended cellulose or cellulose derivative or the aqueous reagent solution) contains a suitable surfactant. It is important that the organic solvent used in the initial cellulose phase be immiscible with the aqueous derivatizing reagent phase, that it not dissolve the cellulose derivative as it is formed, that it have a boiling point at or above the temperature of the derivatizing reaction, that it be insensitive to alkali and not participate in the derivatization reaction.

The two phase procedure may also be used to prepare starch and gum derivatives as well as cellulose derivatives. It may also be used to prepare derivatives containing substituents derived from different reagents without isolating the substitution product from each reagent. This multiple substitution may be accomplished by the addition of several different reagents to the substrate-surfactant alkali mixture at the same time or sequentially.

After completion of the acetal reaction the solid polysaccharide acetals may be separated, if desired, from the reaction mixture by centrifugation or filtration. Preferably, the derivative is purified by washing with water in the case of the starch derivatives, with the aqueous solution of water-miscible solvent in the case of the gum derivatives or with the solvent in the case of the cellulose derivatives. Further washing with a more anhydrous form of the same solvent may be desirable for the gum derivatives. The derivatives are then dried using conventional methods, as in a vacuum, drum, flash, belt, or spray drier.

The conversion of the polysaccharide acetals to the aldehydes is carried out under acidic conditions, typically at a pH of 6 or less, preferably 5 or less, most preferably at about 2–3. It may be carried out directly without isolation of the acetal or the acetal may be isolated as above and resuspended in water prior to conversion. If desired, the derivatives may be recovered as described above.

In addition to preparing the above acetal or aldehydes, modified derivatives may be prepared which contain other substitutent groups, hydroxyalkyl groups (e.g., hydroxypropyl ether groups), carboxyalkyl ether groups (e.g., carboxymethyl), ester groups (e.g., acetate groups), tertiary amino groups (e.g., diethylaminoethyl ether groups), and quaternary amine groups, (e.g. 3-(trimethylammonium chloride)-2-hydroxypropyl groups of 4-(trimethylammonium chloride)-2-butenyl groups), introduced prior to or subsequent to reaction with the acetal derivatizing reagent or introduced simultaneously by reaction with the acetal reagent and other derivatizing reagent. The practitioner will recognize that reactions with reagents introducing labile ester groups should be carried out after the other derivatizations to avoid ester hydrolysis under the alkaline conditions used to prepare other derivatives.

The aldehyde derivatives used as paper additives preferably contain cationic groups, such as the quaternary ammonium and tertiary amine group discussed above, amphoteric, and/or zwitterionic groups. These derivatives are dispersed in water before use. The granular starch derivatives are cooked to provide the dispersed derivative.

The starch may be cooked prior to derivatization to form the acetal, subsequent to derivatization, after conversion to the aldehyde, or most conveniently during conversion of the acetal to the aldehyde. Cooking at pH 6 or less simultaneously converts the acetal to aldehyde and solubilizes and disperses the starch aldehyde. Any conventional cooking procedure may be used, such as cooking a slurry containing the water-soluble or water-swellable derivative in a boiling water bath for about 20 minutes, blowing in steam to heat the slurry to about 93° C. (200° F.), or jet cooking. If a water-dispersible or water-soluble starch base is used for the preparation of the acetal, it will not be necessary to cook the acetal during the acid hydrolysis.

The aldehyde derivative described herein may be used as beater additives, although their addition to the pulp may occur at any point in the paper-making process prior to the ultimate conversion of the wet pulp into a dry web or sheet. Thus, for example, they may be added to the pulp while the latter is in the hydropulper, beater, various stock chests, or headbox. The derivatives may also be sprayed onto the wet web. If the derivative is trapped in the wet fibers after spraying, it may not be necessary to use cationic aldehyde derivatives but they are preferred.

The aldehydes herein may be effectively used for addition to pulp prepared from any type of cellulosic fibers, synthetic fibers, or combinations thereof. Among the cellulosic materials which may be used are bleached and unbleached sulfate (kraft), bleached and unbleached sulfite, bleached and unbleached soda, neutral sulfite, semi-chemical chemiground wood, ground wood or any combination of these fibers. Fibers of the viscous rayon or regenerated cellulose type may also be used if desired.

Any desired inert mineral fillers may be added to the pulp which is to be modified with the aldehydes herein. Such materials include clay, titanium dioxide, talc, calcium carbonate, calcium sulfate and diatomaceous earths. Rosin or synthetic internal size may also be present if desired.

The proportion of the aldehyde to be incorporated into the paper pulp may vary in accordance with the particular pulp involved and the properties desired (e.g., wet strength, temporary wet strength, or dry strength). In general, it is preferred to use about 0.1–10% preferably about 0.25–5% of the derivative, based on the dry weight of the pulp. Within this preferred range the precise amount which is used will depend upon the type of pulp being used, the specific operating conditions, the particular end use for which the paper is intended, and the particular property to be imparted. The use of amounts greater than 5%, based on the dry weight of the pulp, is not precluded, but is ordinarily unnecessary in order to achieve the desired results.

It can be appreciated by the practitioner that a large number of variations may be effected in selecting the acetal derivatizing reagents, reacting them with the bases, converting them to the aldehydes, and utilizing the aldehyde derivatives as wet end additives for paper in accordance with the procedure described above without materially departing from the scope and spirit of the invention. Such variations will be evident to those skilled in the art and are to be included within the scope of the invention.

In the examples which follow, all parts and percentages are given by weight and all temperatures are in degrees Celsius unless otherwise noted. Reagent percentages are based on dry polysaccharide.

The nitrogen content of the cationic bases and resulting acetals was measured by the Kjeldahl method and are based on dry polysaccharide.

The presence of aldehyde groups was determined qualitatively by the viscosity increase of a cooked slurry and/or gel formation and quantitatively by titration.

The quantitative test is carried out by slurrying 5.0 g of the polysaccharide acetal in sufficient distilled water to give 500 g. The pH is adjusted to 2.5 with hydrochloric acid. The polysaccharide is dispersed by cooking in a boiling water bath for 20 minutes. The dispersed polysaccharide is cooled and the solids determined. A 100 g. portion of the dispersed polysaccharide is weighed out, titrated with 0.1 NaOH to the first end point (inflection point is between pH 4.0 and 5) and the ml. of NaOH required is recorded ($T_1$). An aqueous solution (50 ml.) of hydroxylamine hydrochloride (prepared by dissolving 34.75 g. in 1000 ml. volumetric flask and diluting to the mark) is added to a 100 g. portion of the dispersed polysaccharide, heated at reflux for 60 minutes, and titrated with 0.1 N NaOH to pH 4.5. The ml. of NaOH required to reach the inflection point (pH 3.0–3.5) is recorded ($T_2$).

$$\% \text{ aldehyde} = \frac{(T_2 - T_1) \times (\text{normality of NaOH}) \times (2.9)}{\text{polysaccharide weight*}}$$

*polysaccharide weight = 100 g. × % solids of dispersed polysaccharide

Best results are obtained using an automatic titrator. A blank using the base polysaccharide (i.e., unmodified by the introduction of acetal groups) may also be run.

In the paper tests, the tensile strengths are reported as breaking length (m.). The breaking length is the calculated limiting length of a strip of uniform width, beyond which, if such as strip were suspended by one end, it would break of its own weight. The breaking length (air dry) in meters (m.) is calculated using the formula B.L. = 102,000T/R = 3,658T'/R', where T is tensile strength in kN./m., T' is tensile strength in lb./in., R is grammage (air dry) in g./m.², and R' is weight per unit area (air dry in lb./1000 ft.²). Paper specimens are selected in accordance with TAPPI T 400 sampling procedure. Those evaluated for wet strength and temporary wet strength were saturated with distilled water by immersion and/or soaking until the paper sample was thoroughly wetted. The strength was evaluated in accordance with TAPPI T 494 om-82. The measurements were carried out using a constant rate of elongation apparatus, i.e., a Finch wet strength device, which is described in TAPPI Procedure T 456 om-82 (1982). The dry strength was evaluated in accordance with TAPPI T 494 om-81.

EXAMPLE I

This example describes the preparation of known cationic starch acetals by several methods using various starch bases. The reagents used for preparing the starch acetals have the general formula

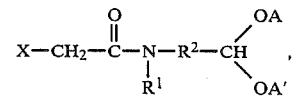

where $R^1$ is H or -$CH_3$, $R^2$ is -$CH_2$-, A and A' are -$CH_3$ or -$C_2H_5$, and X is Cl or Br. They are prepared by reacting a haloacetyl halide with aminoacetaldehyde diethyl acetal or methylaminoacetaldehyde dimethyl acetal as described below.

ACETAL REAGENT PREPARATION

Reagent A—N-(2,2-Dimethoxyethyl)-N-methyl-2-chloracetamide, which has the formula

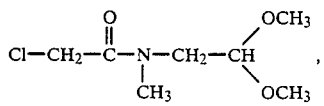

is prepared by adding chloroacetyl chloride (29.05 g.) dropwise to a stirred mixture of methylaminoacetaldehyde dimethyl acetal (33.5 g.) in toluene (170 ml.) and 20% aqueous sodium hydroxide (52.9 g.). The reaction was cooled by immersion in an ice/brine bath and the addition rate was adjusted to maintain the reaction temperature at 0°–5° C. The total addition took 10 mins. at which time the cooling bath was removed. Agitation was continued for an additional 10 mins. and the phases were then separated. Excess toluene was removed from the upper organic phase by distillation at the aspirator to give Reagent A as a brown liquid.

Reagent B—N-(2,2-Diethoxyethyl)chloroacetamide, which has the formula

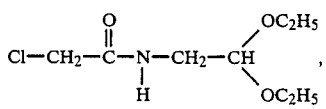

was prepared as above except that aminoacetaldehyde diethyl acetal (37.4 g.) was substituted for the methylaminoacetaldehyde dimethyl acetal. The product was isolated as a yellow waxy solid.

Reagent C—N-(2,2-Dimethoxyethyl)-N-methyl-2-bromoacetamide, which has the formula

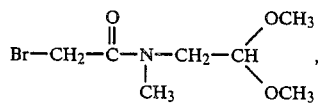

was prepared in the same way as Reagent A except that bromoacetyl chloride (40.4 g.) was substituted for the chloroacetyl chloride. The product was isolated as a brown liquid.

STARCH REACTIONS

Part A. Consecutive Reactions Using Cationic Reagent Followed by Acetal Reagent (1) A waxy maize starch (250 g.) was slurried in 375 ml. of water. To the slurry was added 2.3% calcium hydroxide (Ca(OH)$_2$) followed by 6.3% of a 50% aqueous solution of 2-diethylaminoethylchloride hydrochloride (DEC). The reaction was run at 40° C. for 6 hrs. A 10% aqueous hydrochloric acid solution (HCl) was added to adjust the pH to 3.0. The mixture was filtered and the solids washed. A portion of the filter cake containing 50 g. of the cationic starch ether was dried and analyzed. Cationic N was 0.28%.

The remaining filter cake (about 200 g. starch) was reslurried in 150 ml. water; 80 g. of sodium sulfate (Na$_2$SO$_4$) were added; and the pH was raised to about 11.0–11.5 by adding a 4.5% sodium hydroxide (NaOH) solution containing 10% Na$_2$SO$_4$. A total of 19.0 g. (9.5%) of Reagent A was added. The slurry was placed in a bath at 45° C. for 16 hrs. while maintaining the pH above 11.0 with the 4.5% NaOH solution. The pH was adjusted to about 7.0–8.0 with 10% HCl. The resulting product was filtered, washed with water adjusted to pH 7.0–8.0, and dried. It contained 0.72% total N. The nitrogen content due to the acetal substituent was 0.44%.

(2) The DEC reaction was carried out as in (1) except that corn starch was used. Cationic N was 0.29%. Acetal reaction was carried out using 5% potassium iodide (KI) as a catalyst (see U.S. Pat. No. 3,880,832 cited previously). A total of 1000 g. of the cationic corn starch was suspended in 1250 ml. of water containing 300 g. Na$_2$SO$_4$. An aqueous solution of 40 g. NaOH, 50 g. Na$_2$SO$_4$, and 710 g. water was added slowly to the starch slurry. Then 300 g. of Reagent B were added all at once followed by the KI. Reaction conditions were 16 hr. at 45° C. The derivative was recovered as above but, after washing, it was resuspended in water and 5 g. sodium bisulfite was added. The slurry was filtered but not washed. The bisulfite salt prevents oxidation of the I$^-$ salts to iodine which produces a brown color. Acetal N was 0.41%.

(3) The DEC reaction was carried out on a waxy maize starch using the procedure of (1) except that 40% Na$_2$SO$_4$ was used to repress swelling and 4.5% NaOH was used to maintain the pH at above 10.8. Cationic N was 0.232%. The acetal reaction was carried out as in (1) except that 11% Reagent A (based on about 200 g. starch remaining in the slurry) was used. No Na$_2$SO$_4$ was added. The pH was adjusted to above 10.8 with 4.5% NaOH. Reaction conditions were 19 hr. at 40° C. Acetal N was 0.37%.

(4) The DEC and acetal reactions were carried out on a waxy maize starch using Reagent A (9.5%) and the procedure of (3) except that 12% aqueous potassium hydroxide was used to control the reaction and no Na$_2$SO$_4$ was used. Cationic and acetal N were 0.25% and 0.45% respectively (5) The DEC reaction was carried out on a waxy maize starch using the procedure of (3). Cationic N was 0.26%. The acetal reaction was carried out in 300 ml. of water containing 80 g. Na$_2$SO$_4$. The pH was adjusted to 11.2–11.5 using the NaOH/Na$_2$SO$_4$ solution of (1). Reagent A (11%) was used; the reaction conditions were 19 hr. at 30° C. Acetal N was 0.40%.

(6) The DEC and acetal reactions were carried out as in (5) except at 50° C. Cationic and acetal N were 0.26% and 0.32%, respectively.

Part B. Simultaneous Reaction (1) An unmodified waxy maize starch was slurried in water and 3.15% DEC and 12% Reagent A were added while maintaining the pH above 11.0 with a 4.5% NaOH solution. The reaction mixture was maintained at 45° C. and pH 11.0–11.5 for 16 hr. and then neutralized to pH 7.5. The product was recovered as above. It had a total N content of 0.77%.

(2) A similar reaction was carried out using potato starch (200 g.) and 16 parts of a 50% solution of 3-chloro-2-hydroxypropyl trimethyl ammonium chloride and 12% Reagent A. The product contained 0.91% total N. Cationic N was not determined (theoretical was about 0.3% maximum). The potato starch base contained about 0.013% N. Acetal N should be about 0.60%.

Part C. Consecutive Reaction Using Acetal Reagent Followed by Cationic Reagent

An unmodified waxy maize starch (1000 g.) was slurried in 1500 ml. water containing 400 g. Na$_2$SO$_4$, and the pH was raised to 11.2 with a NaOH solution made by dissolving 40 g. of solid NaOH and 90 g. Na$_2$SO$_4$ in 770 g. water. The above acetal reagent A (10%) was added and the reaction was maintained at pH 11.2 and 45° C. for 16 hrs. The product (recovered as above) had an acetal N content of 0.57%.

The resulting acetal (200 g.) was reacted with 16 g. of the 50% aqueous DEC solution as described above. The final product contained 0.72% total N.

Part D. Dry Reaction 200 g. of a cationic, waxy maize starch (0.26% nitrogen) made as in Part A—No. 3 were impregnated in a Hobart mixer with a solution consisting of 24 g. acetal reagent A, 2.5 g. NaOH and 24 ml. water. After stirring to insure a homogeneous blend, the sample was placed in a jar in an oven at 75° C. After 2 hrs. the sample was suspended in 95-100% ethanol and filtered. The resulting filter cake was resuspended in a 1:1 (by volume) ethanol-water mixture, pH was adjusted to 7.5, and the sample was filtered and washed repeatedly with the 1:1 ethanol:water. Final Nitrogen on the purified product was 0.48%, and therefore an acetal Nitrogen of 0.22% was obtained by the "dry" reaction.

EXAMPLE II

This example describes the preparation of additional starch acetals using reagents other than the acetamide reagents of the previous example.

ACETAL REAGENT PREPARATION

Reagent D—N-(2,2-Dimethoxyethyl)-N-methyl-3-chloropropionamide, which has the formula

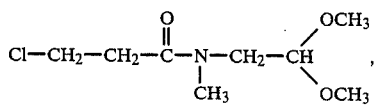

was prepared according to the procedure used to make Reagent A except that chloropropionyl chloride (32.7 g.) was substituted for chloroacetyl chloride. The product was isolated as a pale yellow liquid.

Reagent E—N-(2,2-Dimethoxyethyl)-N-methyl acrylamide, which has the formula

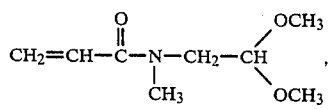

was prepared according to the procedure used to make Reagent A except that acryloyl chloride (23.3 g.) was used instead of chloroacetyl chloride and 4-t-butylcathechol (0.1 g.) was added to the organic phase before removal of the solvent. The final product was isolated as a clear liquid by distillation (65°–66° C.-0.2–0.3 mm Hg.).

Reagent F—1,2-Epoxy-3,3-dimethoxypropane, which has the formula

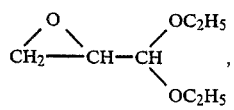

was prepared from acrolein as described D. T. Weisblat et al. See J. Am. Chem. Soc., Vol. 75, p. 5893 (1953).

Reagent G—N-(2,2-Dimethoxyethyl)-N,N-dimethyl-N-(2,3-epoxypropyl) ammonium chloride, which has the formula

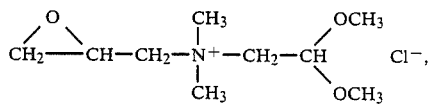

was prepared by adjusting the pH of a 40% solution of dimethylaminoacetaldehyde diethyl acetal (30.01 g.) to pH 7.5 with concentrated HCl and then dropping epichlorohydrin (22.8 g.) into the solution. The reaction mixture was held for 2 hrs. while maintaining the pH between 7.5-8.5 by the addition of concentrated HCl or 50% NaOH. The temperature was maintained at 30°-35° C. Impurities and excess reagent were removed from the reaction mixture by extraction with ethyl acetate (4 times with 65 ml. each time). The product was isolated as an aqueous solution which was pH adjusted to 7.0.

STARCH REACTIONS

The starch reactions with Reagents D to G were carried out as in Example I, Part A, No. 1 using 30 g. $Na_2SO_4$ in the slurry of starch (100 g.) and a solution of 3.4 g. NaOH and 5 g. $Na_2SO_4$ in 70 g. water to adjust the pH. The reagent amounts, starch base, and nitrogen content are shown below.

| Starch Base | % Cationic N in Base | Acetal Reagent | % Acetal N in Cationic Acetal |
|---|---|---|---|
| Waxy corn | 0.270 | 15% D | 0.240 |
| Waxy corn | 0.270 | 12% E | 0.360 |
| Waxy corn | 0.270 | 12% F | None* |
| Corn | None | 15% G | 0.380 |

*No nitrogen in acetal reagent

EXAMPLE III

This example describes the preparation of cellulose acetals. They were prepared using the general procedure of U.S. Pat. No. 4,129,722 (cited previously).

A total of 20 g. SPAN-80 (a surfactant available from Hercules) was dissolved in 200 g. Isopar E (petroleum solvent composed mostly of $C_8$ isoparaffin, b.p. of 116°-142° C.) in a 500 ml. flask equipped with a thermometer, mechanical agitator, condenser and suitable size dropping funnels. Cationic hydroxyethylcellulose (50 g.) grafted with dimethyldiallylammonium chloride (DMDAAC) was added to the solvent-surfactant blend. The 15 g. of Reagent A of Example I was dissolved in 10 ml. water and added to the reaction mixture over a 30 min. period. This was followed by addition of 8 ml. of 10 N NaOH. The temperature was raised to 50° C. and held 3 hrs., followed by cooling to room temperature and neutralization to pH 8.0 with HCl. The cellulose derivative was filtered, washed with Isopar E and dried. Cationic N was 0.81%. Total N after dialysis was 1.43%. Acetal N was therefore 0.62%.

Using an identical procedure methyl cellulose (Methocel from Dow Chemical Co.) and cellulose (C-8002 alpha-cellulose from Sigma Co.) were reacted with 30% and 40%, respectively, of Reagent A. Acetal N on the methyl cellulose was 0.54% before and after dialysis. Acetal N on the alpha-cellulose was 0.3% after exhaustive washing with water.

EXAMPLE IV

This example describes the preparation of the aldehydes.

The starch acetals were converted to the corresponding aldehydes by slurrying the acetal in water (e.g., 100 parts of water/1 part of starch) and adjusting the pH to 2.5–3.0 with a dilute solution of hydrochloric acid. The starch acetals were cooked in a boiling water bath, prior to, after, or during the acidification to gelatinize the starch. The total cooking time was about 20 mins. The slurry was stirred during the acid addition and/or initial cooking. The cook was cooled rapidly.

The cellulose acetals were converted to the corresponding aldehydes as above but it was not necessary to cook the cellulose derivatives. The gum acetals can be converted to the corresponding aldehydes in a like manner.

EXAMPLE V

This example describes the use of the cationic starch aldehydes and cationic cellulose aldehyde as paper strength additives. The aldehydes were added to the indicated paper furnish and handsheets were prepared at pH 6.0, dried at 121° C. (250° F.), cooled, cut into 1 in. strips, and cured at 105° C. (221° F.) for 5 min. The wet and dry tensile strengths are reported as breaking length (B.L.). The addition level was 20 lb./ton.

The derivatives and paper test results are given in Table I. All but Nos. 20 and 21 imparted initial wet strength and dry strength and were superior to the prior art cationic dialdehyde starch in initial wet strength. The cationic cellulose aldehyde provided the highest wet and dry strength.

EXAMPLE VI

This example shows the effect of pH on the aldehyde generation. It also illustrates the preparation of starch acetals containing mixed acetal substituent groups.

Part A—Preparation of The Mixed Acetal Reagents

Reagents H, I, and J were prepared by stirring 25 g. portions of Reagent A of Example I with 600 ml. of isopropanol (Reagent H), n-butanol (Reagent I), and tert-butanol (Reagent J) with 5 drops of concentrated hydrochloric acid for about 18 hours at room temperature. The reaction mixtures were filtered and stripped on a rotary evaporator at 40°–50° C., followed by vacuum pumping at 0.5 mm. Hg for 2 hours at room temperature. NMR analysis showed that about 10–20% of the dimethoxy groups (i.e., $-CH(OCH_3)_2$) had been exchanged with the respective solvents thus introducing isopropoxy groups [i.e., $-CH(OCH(CH_3)_2)_2$], n-butoxy groups [i.e., $-CH(OCH_2CH_2CH_2CH_3)_2$], (and tert-butoxy groups [i.e., $[-CH(OC(CH_3)_3)_2]$.

TABLE I

| No. | Cationic Derivative Starch Base | % Cationic N in Base | Acetal Reagent | Method of Preparation | % Acetal N in Cationic Acetal | Initial Wet Strength (B.L. - m.) | Dry Strength (B.L. - m.) |
|---|---|---|---|---|---|---|---|
| Blank | None | — | — | — | — | 39 | 1682 |
| Control | Cationic Waxy Corn | 0.293 | None | * | None | 87 | 1866 |
| 1 | Corn Aldehyde | 0.293 | 30% B | See Ex. I-Part A2 | 0.409 | 444 | 2392 |
| 2 | Waxy Corn Adlehyde | 0.276 | 20% B | See Ex. I-Part A2 | 0.376 | 352 | 2358 |
| 3 | Corn Aldehyde | 0.278 | 10% A | See Ex. I-Part A2 | 0.502 | 414 | — |
| 4 | Corn Aldehyde | 0.278 | 12% A | See Ex. I-Part A2 | 0.347 | 729 | 3199 |
| 5 | Waxy Corn Aldehyde | 0.270 | 12% C | See Ex. I-Part A1 | 0.240 | 521 | 3019 |
| 6 | Corn Aldehyde | 0.276 | 6% B | See Ex. I-Part A2 | 0.670 | 413 | 3092 |
| 7 | Corn Aldehyde | 0.260 | 30% B | See Ex. I-Part A1 | 0.347 | 526 | 2999 |
| 8 | Corn Aldehyde | 0.287 | 10% A | See Ex. I-Part A2 | 0.491 | 448 | 2439 |
| 9 | Corn Aldehyde | 0.287 | 30% A | See Ex. I-Part A2 | 0.833 | 403 | 2105 |
| 10 | Waxy Corn Aldehyde | 0.240 | 20% B | See Ex. I-Part A2 | 0.202 | 406 | 2868 |
| 11 | Waxy Corn Aldehyde | 0.237 | 10% A | See Ex. I-Part A2 | 0.494 | 552 | 2811 |
| 12 | High Amylose Corn Aldehyde (70% Amylose) | 0.520 | 20% A | See Ex. I-Part A2 | 0.600 | 381 | 2165 |
| 13 | Fluidity Corn Aldehyde (79 WF) | 0.260 | 20% B | See Ex. I-Part A1 | 0.520 | 526 | 2997 |
| 14 | Fluidity Waxy Corn Aldehyde (35 WF) | 0.240 | 12% A | See Ex. I-Part A1 | 0.456 | 542 | 3010 |
| 15 | Fluidity Waxy Corn Aldehyde (85 WF) | 0.240 | 12% A | See Ex. I-Part A1 | 0.447 | 334 | 2203 |
| 16 | Waxy Corn Aldehyde** | N.D. | 12% A | See Ex. I-Part 1B | N.D. | 394 | 1907 |
| 17 | Waxy Corn Aldehyde | 0.270 | 15% D | See Ex. II | 0.240 | 474 | 2744 |
| 18 | Waxy Corn Aldehyde | 0.270 | 12% E | See Ex. II | 0.360 | 476 | 2504 |
| 19 | Waxy Corn Aldehyde | 0.270 | 12% F | See Ex. II | None | 317 | 2268 |
| 20 | Corn Aldehyde | None | 12% G | See Ex. II | 0.38 | 69 | 1372 |
| 21 | Waxy Corn Aldehyde | 0.27 | 10% S | See Ex. XI | None | 89 | 1483 |
| 22 | Waxy Corn Aldehyde | 0.27 | 12% W | See Ex. XV | None | 192 | 1518 |
| 23 | Waxy Corn Aldehyde | 0.27 | 15% X | See Ex. XVI | N.D. | 190 | 1603 |
| 24 | Waxy Corn Aldehyde | 0.27 | 10% Y | See Ex. XVII | None | 205 | 1594 |
| Comparative | Cationic Dialdehyde Starch*** | 1.77 | None | Periodate Oxidation | None | 269 | 2176 |

| Cationic Derivative | % Cationic N in Base | Acetal Reagent | Method of Preparation | % Acetal N in Cationic Acetal | Wet Strength | Dry Strength |
|---|---|---|---|---|---|---|

TABLE I-continued

| Cellulose Base | 0.812 | 30% A | see Example III | 0.62 | 1660 | 6710 |

*Prepared as in Part A-1 of Example I except that no acetal reagent was used.
**Total N was 0.773%.
N.D. — Not determined.
***Caldas 10 (a commercial product from Japan Carlit Co.)
The control starch (which contained cationic groups from DEC), cationic dialdehyde starch, and cationic starch aldehydes of the present invention (Nos. 1-3, 5, 8, 9, 12 and 16-24) were evaluated in a paper furnish of 30% bleached Kraft and 70% b bleached sulfite. The other cationic starch aldehydes of the present invention (Nos. 4, 6, 7, 10, 11 and 13-15) were evaluated in a paper furnish of 60% bleached Kraft and 40% bleached sulfite. The cationic cellulose aldehyde was evaluated in a paper furnish of 50% bleached Kraft and 50% bleached sulfite.

Part B—Preparation of The Starch Derivatives

Cationic waxy maize acetal starch derivatives were prepared using the above reagents and the procedure of Example I, Part A (3). Nitrogen analysis showed the following:

| Starch | Reagent | % Cationic N | % Acetal N |
|---|---|---|---|
| 25 | H | 0.28 | 0.37 |
| 26 | I | 0.28 | 0.33 |
| 27 | J | 0.28 | 0.34 |
| Control | — | 0.28 | — |

Part C—Evaluation of Wet Strength after Conversion To Aldehyde at Various pH Values One gram samples of the above starch acetals were slurried in water to a total weight of 100 g. and the pH was adjusted to pH 2.5 or 5.0. The starches were cooked and evaluated in paper handsheets as in Example VIII, Part A. The results are shown in Table II.

TABLE II

| Cationic Starch Derivative No. | Cook pH | Addition Level (lb./ton) | Initial Wet Strength (B.L. - m.) |
|---|---|---|---|
| 25 | 2.5 | 10 | 279 |
| 25 | 2.5 | 20 | 409 |
| 25 | 5.0 | 10 | 82 |
| 25 | 5.0 | 20 | 287 |
| 26 | 2.5 | 10 | 231 |
| 26 | 2.5 | 20 | 370 |
| 26 | 5.0 | 10 | 91 |
| 26 | 5.0 | 20 | 279 |
| 27 | 2.5 | 10 | 251 |
| 27 | 2.5 | 20 | 413 |
| 27 | 5.0 | 10 | 97 |
| 27 | 5.0 | 20 | 294 |
| Control (Cationic Starch Base) | 5.0 | 20 | 89 |

The results show that the wet strength was much higher for starch acetal derivatives cooked at pH 2.5 rather than pH 5.0. At the higher addition level the wet strength increased even for the derivatives cooked at the higher pH. This shows aldehydes were generated at the higher pH.

EXAMPLE VII

This example describes the temporary wet strength provided by the cationic aldehydes. The aldehydes were evaluated for both tissue/toweling applications (Part A) and board and bag applications (Part B).

PART A

The derivatives evaluated were the aldehydes prepared from a cationic waxy corn starch acetal similar to the derivative of Example I—Part A-1 and the cationic cellulose acetal Example III. One starch aldehyde was cooked as in Example IV, but at a pH of 7, to provide a liquid starch acetal. The acetal was then hydrolyzed to the aldehyde by adjusting the pH to 2.5 and then heating at 90°–100° C. for 10–15 min. It was then added to the paper furnish. The other starch aldehyde was prepared by cooking the acetal at pH 2.5.

One cationic cellulose acetal was cooked as above at pH 7 to provide a liquid cellulose acetal. It was then hydrolyzed to the aldehyde by adjusting the pH to 2.5 and cooked as above. The other cellulose acetal was cooked at pH 2.5. For comparison, the cationic starch base, as well as cationic starch acetal which had been cooked at a pH of 7 but not hydrolyzed, were evaluated (see Table II).

The addition level was 20 lb./ton. The furnish was a 50:50 bleached sulfite:bleached Kraft. The paper sheets were prepared on the Noble and Wood Sheet Mold. The paper weight was about 5 lb./1000 ft.$^2$ The wet and dry strength results are shown in Table III.

The results show that all the cationic derivatives improved the dry strength with the cationic starch aldehyde providing the most improvement. Only the cationic aldehydes improved the wet strength. The starch aldehyde prepared by simultaneously cooking and hydrolyzing the acetal was better than the precooked and subsequently hydrolyzed acetal in dry strength, initial wet strength, and temporary wet strength.

TABLE III

| Sample | Dry Strength (B.L. in m.) | Wet Strength (B.L. in m.) | | | % Relative Wet Strength* | | |
|---|---|---|---|---|---|---|---|
| | | Initial | 30 Min. | 16 Hr. | Initial | 30 Min. | 16 Hr. |
| Blank | 1210 | 49 | 20 | 33 | 4.1 | 1.7 | 2.7 |
| Cationic Starch Base | 1640 | 83 | 43 | N.D. | 5.1 | 2.6 | 2.1 |
| Cationic Starch Acetal (comparative) | 1530 | 71 | 51 | 32 | 4.7 | 3.3 | 2.1 |
| Cationic Starch Aldehyde (cooked at pH 2.5) | 2140 | 382 | 260 | 122 | 17.9 | 12.1 | 5.7 |
| Cationic Starch Aldehyde (precooked acetal) | 1830 | 296 | 217 | N.D. | 16.2 | 11.9 | N.D |
| Cationic | 1550 | 335 | 258 | N.D. | 21.6 | 16.6 | N.D |

TABLE III-continued

| Sample | Dry Strength (B.L. in m.) | Wet Strength (B.L. in m.) | | | % Relative Wet Strength* | | |
|---|---|---|---|---|---|---|---|
| | | Initial | 30 Min. | 16 Hr. | Initial | 30 Min. | 16 Hr. |
| Cellulose Aldehyde Cationic Cellulose Aldehyde (precooked acetal) | 1610 | 350 | 277 | N.D. | 21.7 | 17.2 | N.D. |

*Wet Strength/Dry Strength × 100.
N.D. — Not determined.

PART B

Some of the derivatives were also evaluated at 20 lb./ton in a furnish of 100% unbleached Kraft containing 3% alum (i.e., aluminum sulfate). The paper weight was about 42 lb./1000 sq. ft. The results are shown in Table IV.

The results again show that all the cationic derivatives improved the dry strength with the cellulose aldehydes being the best. Only the aldehydes provided wet strength.

TABLE IV

| Sample | Dry Strength (B.L. in m.) | Wet Strength (B.L. in m.) | | | % Relative Wet Strength | | |
|---|---|---|---|---|---|---|---|
| | | Initial | 30 Min. | 16 Hr. | Initial | 30 Min. | 16 Hr. |
| Blank | 5330 | 516 | 455 | 360 | 9.7 | 8.5 | 6.8 |
| Cationic Starch Base | 6050 | 533 | 471 | N.D. | 8.8 | 7.8 | N.D. |
| Cationic Starch Acetal | 5720 | 507 | 404 | N.D. | 8.9 | 7.1 | N.D. |
| Cationic Starch Aldehyde (cooked at pH 2.5) | 5711 | 1100 | 746 | 637 | 19.3 | 13.1 | 11 2 |
| Cationic Cellulose Aldehyde | 6710 | 1660 | 1400 | 1160 | 24.7 | 20.9 | 17.3 |
| Cationic Cellulose Aldehyde (precooked acetal) | 6160 | 1640 | 1420 | N.D. | 26.6 | 23.1 | N.D. |

EXAMPLE VIII

This example describes the preparation of the aldehyde-containing starch derivative having the structure Starch—O—$CH_2$—CH=CH—CHO.

Part A—Preparation of The Acetal-Containing Reagent

4-Chloro-1,1-dimethyoxy-2-butene (Reagent K) was prepared by reacting 7.46 g. of 4-chloro-2-butenal with 200 ml. of anhydrous methanol and a catalytic amount of hydrochloric acid. The reaction mixture was stirred at room temperature for 16 hours, neutralized with sodium carbonate, filtered, and concentrated.

Part B—Preparation of The Acetal-Containing Starch Derivative

A total of 25 g. of corn starch was slurried in a solution of 0.6 g. sodium hydroxide and 7.5 g. sodium sulfate in 33 ml. of water, and 2.75 g. of the above reagent (11% treatment) were added. The reaction was carried out at 48° C. for 16 hours. The slurry was neutralized to pH 7.7 with 3:1 hydrochloric acid, filtered, and washed with 400 ml. of water (pH 7.5–8) and then with 50 ml. of acetone. The resulting starch acetal was air dried.

Part C—Preparation of The Aldehyde-Containing Starch Derivative

A total of 8 g. of the above starch acetal was sluried in 96 ml. of water adjusted to pH 2.5 with 3:1 HCl. It was then cooked with stirring for 20 minutes in a boiling water bath to simultaneously convert the acetal to the aldehyde and cook the starch. Upon cooling, the cook containing the aldehyde formed a soft gel with a very heavy viscosity and very lumpy texture. Gel formation indicated the presence of the aldehyde groups. For comparison, the corn starch acetal was cooked as above but without acidification. Upon cooling, the cook appeared to be stable with an opaque soft set and grainy texture. The presence of the aldehyde group was verified by the titration procedure previously described. It contained 0.2% more latent aldehyde than the base starch.

EXAMPLE IX

This example describes the preparation of the aldehyde-containing starch derivative having the structure Starch-O-$CH_2$-C≡C-CHO.

Part A—Preparation of The Acetal-Containing Reagent

4-Bromo-1,1-diethoxy-2-butyne (Reagent L) was prepared according to the procedure of R. Epsystein and S. Marszak, Bull. Soc. Chim. Fr., I, pp. 313–17 (1968). A total of 74.1 g. (0.40 mole) of propargyl bromide, 59.28 g. (0.40 mole) of triethylorthoformate, and 3.2 g. (0.010 mole) of zinc iodide were combined in a reaction flask fitted with a packed distillation column and a stillhead. The mixture was heated to 100°–110° C. and ethanol was removed by slow distillation over 2.5 hours. Hexane (96 ml.) was added as required to maintain the stillhead temperature below 80° C. The pot residue was diluted with 200 ml. methylene chloride, washed with water and brine, dried with magnesium sulfate, filtered, and then distilled. A forerun of ethylorthoformate was collected, followed by the acetal at 50°–77° C./5–10 mm.

Part B—Preparation of The Acetal-Containing Starch Derivative

A total of 25 g. of corn starch was slurried in a solution of 0.6 g. sodium hydroxide and 7.5 g. sodium sulfate in 33 ml. of water, and 2.86 g. of the above reagent (11% treatment) were added. The reaction was carried out at 45°–50° C. for 16 hours. The slurry was neutralized to pH 7.6 with 3:1 hydrochloric acid, filtered, and washed with 300 ml. of water (pH 7.5–8) and then with 100 ml. of acetone. The resulting starch was air dried.

Part C—Preparation of The Aldehyde-Containing Starch Derivative

The starch acetal was converted to the aldehyde using the acidification and cooking procedure of Example VIII. The cook formed a gel while still hot. The cooled gel was opaque and golden yellow. For comparison, the corn starch acetal was cooked as above except without acidification. Upon cooling, the opaque cook appeared to be very stable with a very soft set and smooth lumpy texture. Gel formation indicated the presence of aldehyde groups.

EXAMPLE X

This example describes the preparation of starch derivatives containing aldehyde groups which have the structures

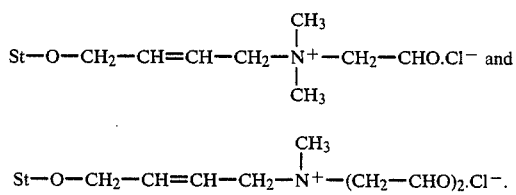

Part A—Preparation of The Acetal Reagents

A total of 125 g. (0.8 mole) of 1,4-dichloro-2-butene was heated to 50° C. and 12.9 g. (0.08 mole) of dimethylamino acetaldehyde diethyl acetal was added dropwise over 1 hr. The reaction mixture was then heated to 70° C. and stirred for 2 hours. Excess dichlorobutene was removed by vacuum distillation (74°–76° C./40 mm. Hg) to give an orange syrup. The crude product was dissolved in 200 ml. water and washed three times with 40 ml. of methylene chloride. The aqueous solution was then concentrated to a viscous orange oil on a rotary evaporator (pot temperature 50° C., pressure 3–10 mm.). The product (Reagent M), N,N-dimethyl-N-(2,2-diethoxy ethyl)-N-(4-chloro-2- butenyl) ammonium chloride, contained 7.5% organic chlorine.

In a like manner, N,N-dimethyl-N-(2,2-dimethoxy ethyl)-N-(4-chloro-2-butenyl) ammonium chloride (Reagent N) and N,N-bis-(2,2-diethoxy ethyl)-N-methyl-N-(4-chloro-2-butenyl) ammonium chloride (Reagent O) were prepared using dimethylamine acetaldehyde dimethyl acetal and N,N-bis(2,2-diethoxy ethyl)methyl amine instead of the dimethylaminoacetaldehyde diethyl acetal.

Part B—Preparation of the Acetal-Containing Starch Derivative

The above reagents were reacted with corn starch using the procedure described in Exampale IX. The starch products were analyzed for N. The reactions were as follows:

| Starch Base | Acetal Reagent (%) | Acetal N in Cationic Acetal (%) |
| --- | --- | --- |
| Waxy corn | M 12 | 0.456 |
| Corn | N 10 | 0.444 |
| Corn | O 11 | 0.230 |

Part C—Preparation of The Aldehyde-Containing Starch Derivative

The acetal-containing derivatives were converted to the corresponding aldehydes using the procedure of Part C of Example VIII. Upon cooking at low pH there was an increase in viscosity indicating the presence of aldehyde groups. Cooking without acidification gave stable solutions which did not retrograde into gels.

EXAMPLE XI

The example describes the preparation of aldehyde-containing derivatives which have the structure

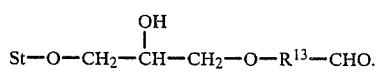

Part A—Preparation of the Acetal-Containing Reagents

A-I. The following alcohol-containing acetals were prepared and then reacted with epichlorohydrin to introduce the epoxide groups necessary for the starch reaction.

PREPARATION OF THE ALCOHOL-CONTAINING ACETALS

Reagent P 2-[2-(2-Hydroxyethoxy)propyl]-1,3-dioxolane

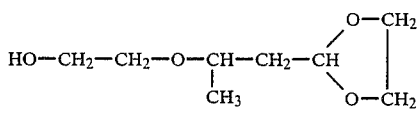

A total of 35.0 g. (0.5 mole) of crotonaldehyde and 124 g. (2.0 mole of ethylene glycol were dissolved in 200 ml. of toluene and added to a 500 ml. round bottom flask equipped with magnetic stir bar, heating mantle, Dean-Starke trap, reflux condenser and nitrogen inlet. p-Toluene-sulfonic acid (0.6 g.–0.003 mole) was added to the mixture. The mixture was refluxed until the calculated amount of water (9.0 g.) was collected, cooled quickly in an ice bath to room temperature, and then dried and simultaneously neutralized with excess sodium carbonate. The solution was filtered and the solvent removed under vacuum (rotovap). The residual brown oil was subjected to high vacuum distillation. The first fraction, collected between 55° and 80° C. at 0.5 mm./Hg, was primarily ethylene glycol. The second fraction, collected at between 80° and 90° C., was primarily the above dioxolane with a trace amount of ethylene glycol which can be removed by column chromatography (neutral alumina: ether/petroleum ether: 1/1). Yield was 50–60%.

Reagent Q 2-[2-(2-Hydroxyethoxy)ethyl]-1,3-dioxolane

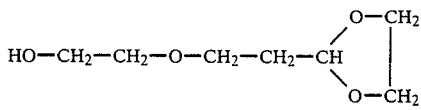

This dioxolane was prepared from acrolein using the above conditions. It had a boiling point of 75°-85° C. at 0.5 mm./Hg. Yield was 50-60%.

Reagent R 3-Hydroxy-2,2-dimethylpropionaldehyde Dimethyl Acetal

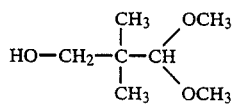

A total of 50.0 g. (0.49 mole) of 3-hydroxy-2,2-dimethylpropionaldehyde was dissolved in 500 ml. of anhydrous methanol and placed in a 1000 ml. round bottom flask equipped with magnetic stir bar and drying tube. One drop of concentrated hydrochloric acid was added and the solution was allowed to stir overnight. The reaction mixture was then neutralized with sodium carbonate, filtered, and the solvent removed under vacuum. The resulting opaque white oil was vacuum distilled to give a water clear oil having a boiling point of 155° C. at house vacuum. Yield was 55%.

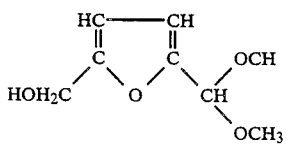

A total of 5.0 g. (0.039 mole) of 5-hydroxymethyl furfuraldehyde was dissolved in 150 ml. of anhydrous methanol. The reaction was carried out as above. The resulting red-brown oil was determined by NMR to be 98% acetal. Yield was 100%.

Modification of The Alcohol-Containing Acetals with Epichlorohydrin

PROCEDURE 1

This procedure was used with the water-soluble, alcohol-containing acetals.

A total of 6.0 g. of appropriate dimethyl acetal (9.035 mole) was added to 1.54 g. sodium hydroxide (0.038 mole) in a 100 ml. round bottom flask equipped with magnetic stir bar, reflux condenser, and nitrogen inlet. After stirring for 30 mins., 3.89 g. (0.042 mole) of epichlorohydrin in 50 ml. of methyl ethyl ketone was added quickly, and the reaction mixture was allowed to reflux overnight under a nitrogen atmosphere. The resulting oil was mixed with 250 ml. of toluene, and the toluene was then distilled off at atmospheric pressure to remove any residual epichlorohydrin. The sample was freed of toluene by subjecting it to high vacuum overnight. Yield was 60-85%.

In a like manner Reagents P and Q were reacted with epichlorohydrin.

PROCEDURE 2

This procedure was used with the water-insoluble, alcohol-containing acetals.

A total of 2.67 g. of a 60% oil dispersion of sodium hydride (0.0676 mole) was added to a 100 ml. three neck round bottom flask equipped with reflux condenser, addition funnel, magnetic stir bar, and nitrogen inlet. The oil was removed by triturating three times with 25 ml. of petroleum ether. Then 10.0 g. 3-hydroxy-2,2-dimethylpropionaldehyde dimethyl acetal (0.0676 mole) [Reagent R] was dissolved in 20 ml. of tetrahydrofuran (THF) and added to the mixture dropwise over 30 mins. The reaction mixture was allowed to stir for 30 mins. before 6.9 g. (0.0743 mole) epichlorohydrin was added. The reaction was refluxed overnight, cooled, and checked for active hydride by adding a drop of methanol. If bubbling was detected, methanol was added dropwise until all bubbling stopped. The reaction mixture was filtered and the solvent was removed under vacuum. The product was freed of residual epichlorohydrin by azeotropic distillation using tolene (200 ml.).

A-II. The following alcohol-containing aldehyde was first reacted with epichlorohydrin to introduce the epoxide functionality and the aldehyde was then converted to the acetal.

Part B Preparation of The Acetal-Containing Starch Derivatives

The following procedure was used to prepare the starch derivatives. A solution of 9.0 g. sodium sulfate (36% based on starch) was dissolved in 40 ml. of distilled water and 0.375 g. sodium hydroxide (1.5% based on starch) was dissolved in the salt solution. A total of 25 g. of starch was added quickly and shaken to a uniform consistency. The indicated reagent was added and the container was sealed and placed in a tumbler and heated at 45° C. for 30 hours. The starch slurry was cooled to room temperature and neutralized to pH 7.5 with HCl. The starch was then filtered, washed three times with 100 ml. of water and twice with 100 ml. isopropanol, and air dried. It was analyzed by titration.

The starch reactions are summarized below:

| Starch Base* | Acetal Reagent (%) | NaOH (%) | Reaction Time (hr.) | CHO by Titration (%) |
|---|---|---|---|---|
| corn | P 10 | 1.50 | 18 | 0.40 |
| " | P 10 | 3.00 | 18 | 0.74 |
| " | Q 10 | 1.75 | 18 | N.D. - Strong gel |
| " | R 10 | 1.50 | 18 | 0.31 |
| " | R 10 | 3.00 | 18 | 0.10 |

N.D. — not determined
*Waxy maize starch was treated with 3% DEC prior to the acetal reagent reaction and contained 0.27% N.

Part C

Preparation of The Aldehyde-Containing Starch Derivatives

The starch acetals were converted to the aldehydes using the procedure of Example IV.

EXAMPLE XIV

This example describes the preparation of aldehyde-containing derivatives which have the structure

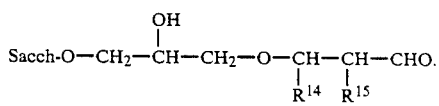

Part A—Preparation of The Cyclic Acetal-Containing Reagents

Reagent U 2-[2-(3-Chloro-2-hydroxypropyl)ethyl]-5,5-dimethyl-1,3-dioxane 2-Ethenyl-5,5-dimethyl-1,3-dioxane was prepared by adding 15.4 g. of acrolein (9.275 mole) and 26.0 g. (0.25 mole) 2,2-dimethyl-1,3-propanediol to a 100 ml. round bottom flask equipped with magnetic stir bar and thermocouple. Hydrochloric acid (0.1 ml. 37%) was added to the reaction and the temperature dropped to about 5° C. After all of the diol was dissolved, the reaction exothermed to approximately 45° C. After the reaction was cooled to 30° C., the mixture was placed in a separatory funnel. The lower aqueous layer was removed and the organic layer simultaneously neutralized and dried with excess sodium carbonate (anhydrous). The material was filtered and distilled (Bp 40° C. at 10 mm/Hg) to give a water clear liquid.

A total of 14.2 g. (0.1 mole) of the above dioxane, 11.6 g. (0.105 mole) of 3-chloro-1,2-propanediol, and 0.03 g. of p-toluenesulfonic acid (0.00015 mole) were introduced into a 250 ml. round bottom flask equipped with magnetic stir bar, heating mantle, reflux condenser, and drying tube. Cyclohexane (100 ml.) was added to the flask and the reaction was allowed to reflux overnight. The reaction was then cooled to room temperature, neutralized with sodium carbonate, washed three times with 50 ml. of water, dried over sodium carbonate, filtered, and the solvent removed under vacuum. The resulting water clear oil required no further purification.

Reagent V 2-[2-(3-Chloro-2-hydroxypropyl)propyl]-5,5-dimethyl-1,3-dioxane

2-Propenyl-5,5-dimethyl-1,3-dioxane was prepared as above except that crotonaldehyde was used in place of the acrolein. Due to the fact that cortonaldehyde does not exotherm, as does acrolein, the reaction was run in a water bath at 35°–45° C. and then cooled to room temperature to separate the water. The product had a boiling point of 55° C. at 5 mm. Hg. The resulting dioxane was then reacted with 3-chloro-1,2-propanediol as described above.

Part B—Preparation of The Acetal-Containing Starch Derivative

A solution of 20 g. of sodium sulfate in 65 ml. of water was prepared in an eight ounce tall bottle, in which sodium hydroxide (2.0 g) was dissolved. A total of 50 g. of the indicated starch was added quicklly to the solution and stirred by means of an overhead stirrer. The indicated reagent was added to the slurry and the bottle was sealed and placed in a tumbler overnight at 45° C. In the morning the slurry was cooled to room temperature and neutralized to pH 8 with 3:1 HCl. The slurry was then filtered and the resulting cake was washed twice with 300 ml. of water and twice with 300 ml. of isopropanol. The cake was then crushed by hand and air-dried to approximately 12% moisture.

The starch reactions are summarized below.

| Starch Base* | Acetal Reagent (%) | NaOH (%) | Reaction Time (hr.) | CHO by Titration (%) |
|---|---|---|---|---|
| corn | U 10 | 1.5 | 18 | 0.304 |
| waxy maize | U 10 | 3.0 | 18 | 0.637 |
| " | U 10 | 3.0 | 18 | N.D. |
| " | U 10 | 2.5 | 18 | N.D. |
| " | U 10 | 2.0 | 18 | N.D. |
| " | V 10 | 2.25 | 24 | 0.42 |

N.D. — not determined
*The waxy maize starch was treated with 3% DEC and contained 0.27% N.

Part C—Preparation of The Aldehyde-Containing Starch Derivative

The starch acetals were converted to aldehydes using the procedure of Example IV.

EXAMPLE XV

This example describes the preparation of the derivative having the structure

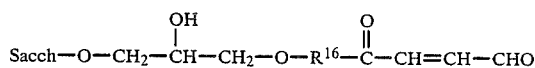

and/or

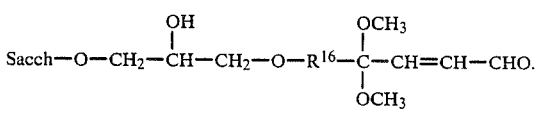

Part A—Preparation of The Acetal-Containing Reagent

Furfuryl glycidyl ether was prepared by adding 49 g. 2-furfuralcohol (0.50 mole) dissolved in 200 ml. of water to a water-alcohol solution of 21.0 g. (0.525 mole) sodium hydroxide. It was stirred until the mixture reached ambient temperature. Then 51.4 g. (0.55 mole) of epichlorohydrin were added. The temperature rose for two hours reaching a maximum at 30° C. The reaction was allowed to stir overnight. The product was extracted into ether and dried over magnesium sulfate. The solvent was removed under vacuum to give 54 g. of a light golden oil.

The ring opening reaction was carried out by introducing 42.5 g. (0.163 mole) of the above ether dissolved in 250 ml. anhydrous methanol to a 500 ml. three neck round bottom flask equipped with an addition funnel, magnetic stir bar, gas inlet, and cooling bath. The mixture was cooled to −45° C. A solution of 26.0 g. (0.325 mole) bromine in 65 ml. methanol was added dropwise while maintaining the temperature at or below −35° C. After the addition was complete, the reaction mixture was placed in a bath at −10° C. and stirred for two hours. The reaction mixture was cooled to −45° C. and neutralized by passing a stream of anhydrous ammonia over the liquid until the mixture was at pH 8. The precipitate (ammonium bromide) was filtered and the filter cake was washed with ether. Potassium carbonate (0.6 g.—0.004 mole) was dissolved in the liquid and the solvent removed under vacuum. Ethyl acetate (100 ml.) was added and the resulting slurry was treated with activated charcoal and magnesium sulfate. The solution was then filtered and the solvent removed under vacuum.

Part B—Preparation of The Acetal-Containing Starch Derivative

A total of 15–20 g. of sodium sulfate and 1–1.5 g. sodium hydroxide was dissolved in 75 ml. of water and 50 g. of a starch was added. The above epoxide-containing acetal, Reagent W, (in the indicated amount based on starch) was added with stirring. The container was placed in a tumbler at 45° C. for 24 hours. The reaction mixture was then cooled to room temperature and neutralized to pH 7.5, filtered, washed with water and alcohol, if necessary, and air dried overnight. The starch reactions are summarized below.

| Starch Base* | Acetal Reagent (%) | NaOH (%) | Reaction Time (hr.) | Aldehyde by Titration (%) |
|---|---|---|---|---|
| waxy maize | W 12 | 2.0 | 24 | 0.54 |
| waxy maize | W 12 | 2.0 | 24 | 0.182 |

*Treated with 3% DEC and containing 0.27% N.

Part C—Preparation of The Aldehyde-Containing Starch Derivatives

The starch acetals were converted to aldehydes using the procedure of Example IV.

EXAMPLE XVI

This example describes the preparation of the derivative having the structure $$\text{Sacch}-\text{O}-\text{CH}_2-\overset{\overset{\text{O}}{\|}}{\text{C}}-\text{NH}-\text{R}^{17}-\overset{\overset{\text{O}}{\|}}{\text{C}}-\text{CH}=\text{CH}-\text{CHO}.$$

Part A—Preparation of The Acetal-Containing Reagent

N-Furfurylchloroacetamide was prepared by adding 20.0 g. (0.206 mole) furfuryl amine in sufficient toluene to make a 15% solution to a 500 ml. three neck round bottom flask equipped with magnetic stir bar, addition funnel, and cooling bath and then adding 36 ml. of 20% sodium hydroxide. The mixture was cooled to 0°–5° C. and chloroacetyl chloride was added dropwise so that the reaction temperature was maintained at 5°–10° C. After the addition, a solid deposited on the walls of the flask. It was recrystallized from ether as a light tan solid. Yield was 85%.

The ring was opened using the procedure described in Example XV to give Reagent X.

Part B—Preparation of The Acetal-Containing Starch Derivative

Using the procedure of Example XV the following starch reaction was carried out.

| Starch Base* | Acetal Reagent (%) | NaOH (%) | Reaction Time (hr.) | CHO by Titration (%) |
|---|---|---|---|---|
| Waxy maize | X 15 | 3.0 | 18 | 0.59 |

*Treated with 3% DEC and containing 0.27% N.

Part C—Preparation of The Aldehyde-Contaning Starch Derivative

The starch acetals were converted to aldehydes using the procedure of Example IV.

EXAMPLE XVII

This example describes the preparation of the derivative having the structure $$\text{Sacch}-\text{O}-\text{R}^{18}-\underset{\underset{\text{CHO}}{|}}{\text{C}}=\text{CH}-\text{CHO}.$$

Part A—Preparation of The Acetal-Containing Reagent

3-Chloromethyl furan was prepared by adding 5.0 g. (0.051 mole) 3-furanmethanol and 6.8 g. (0.056 mole) collidine to a 250 ml. three neck flask equipped with an addition funnel, nitrogen inlet, and magnetic stirrer. The mixture was cooled to 0° C. Lithium chloride dissolved in a minimum amount of dimethyl formamide was added dropwise to the mixture while maintaining the temperature at about 5° C. The mixture was allowed to stir for an additional 1.5 hrs. and then poured onto ice. The solution was extracted three times with 200 ml. of a 1:1 mixture of ether/petroleum ether. The combined extracts were washed with saturated copper nitrate until the blue color persisted. The extracts were dried over sodium sulfate and the solvent was removed under vacuum to give a light yellow liquid.

Treatment of the resulting product with bromine and methanol yielded allylic diacetal, Reagent Y.

Part B—Preparation of The Acetal-Containing Starch Derivatives

Using the procedure of Example XV the following starch reactions were carried out.

| Starch Base* | Acetal Reagent (%) | NaOH (%) | Reaction Time (hr.) | Aldehyde by Titration (%) |
|---|---|---|---|---|
| waxy maize | Y 10 | 2.5 | 24 | 0.22 |
| " | Y 5 | 2.5 | 24 | 0.20 |
| " | Y 15 | 2.5 | 24 | 0.26 |

*Treated with 3% DEC and containing 0.27% N.

Part C—Preparation of The Aldehyde-Containing Starch Derivatives

The starch acetals were converted to aldehydes using the procedure of Example IV.

Now that the preferred embodiments of the invention have been described in detail, various modifications and improvements thereon will become readily apparent to those skilled in the art. Accordingly, the spirit and scope of the present invention are to be limited only by the appended claims and not by the foregoing specification.

What is claimed is:

1. An acetal having the structure $$X-\text{CH}_2-\underset{\underset{}{|}}{\overset{\overset{\text{OH}}{|}}{\text{CH}}}-\text{CH}_2-\text{O}-\underset{\underset{\text{R}^{14}}{|}}{\text{CH}}-\underset{\underset{\text{R}^{15}}{|}}{\text{CH}}-\text{CH}\diagup\overset{\text{O}-\text{CH}_2}{\underset{\text{O}-\text{CH}_2}{}}\diagdown\text{C}\diagup\overset{\text{CH}_3}{\underset{\text{CH}_3}{}},$$

$R^{14}$ and $R^{15}$ are individually hydrogen or a methyl group; and X is a halogen.

2. The acetal having the structure $$X-\text{CH}_2-\underset{\underset{}{|}}{\overset{\overset{\text{OH}}{|}}{\text{CH}}}-\text{CH}_2-\text{O}-\underset{\underset{\text{R}^{14}}{|}}{\text{CH}}-\underset{\underset{\text{R}^{15}}{|}}{\text{CH}}-\text{CH}\diagup\overset{\text{O}-\text{CH}_2}{\underset{\text{O}-\text{CH}_2}{}}\diagdown\text{C}\diagup\overset{\text{A}}{\underset{\text{A}'}{}},$$

wherein $R^{14}$ and $R^{15}$ are individually hydrogen or a methyl group and A and A' are independently a lower alkyl group, which is prepared by the steps of:

(a) reacting acrolein, methacrolein, or crotonaldehyde and a 2,2-dialkyl-1,3-propanediol to form an unsaturated dioxane having the structure $$\text{CH}=\underset{\underset{\text{R}^{14}}{|}}{\text{C}}-\underset{\underset{\text{R}^{15}}{|}}{\text{CH}}\diagup\overset{\text{O}-\text{CH}_2}{\underset{\text{O}-\text{CH}_2}{}}\diagdown\text{C}\diagup\overset{\text{A}}{\underset{\text{A}'}{}},$$

where $R^{14}$ and $R^{15}$ are both H when acrolein is used, $R^{14}$ is H and $R^{15}$ is CH when methacrolein is used, and $R^{14}$ is $CH_3$ and $R^{15}$ is H when crotonaldehyde is used and where A and A' are independently a lower alkyl group and (b) reacting the unsaturated dioxane and a 3-halo-1,2-propanediol.

3. The acetal of claim 2, wherein the 3-halo-1,2-propanediol is 3-chloro-1,2-propanediol.

4. The acetal of claim 1, wherein $R^{14}$ and $R^{15}$ are H.

5. The acetal of claim 1, wherein or $R^{14}$ is $CH_3$ and $R^{15}$ is H or $R^{14}$ is H and $R^{15}$ is $CH_3$.

6. The acetal of claim 1, wherein X is Cl.

7. The acetal of claim 4, wherein X is Cl.

8. The acetal of claim 5, wherein X is Cl.

9. The acetal of claim 2, wherein $R^{14}$ and $R^{15}$ are H and A and A' are $CH_3$.

10. The acetal of claim 2, wherein $R^{14}$ is $CH_3$ and $R^{15}$ is H or $R^{14}$ is H and $R^{15}$ is $CH_3$ and A and A' are $CH_3$.

11. The acetal of claim 2, wherein X is Cl.

12. The acetal of claim 9, wherein X is Cl.

13. The acetal of claim 10, wherein X is Cl.

* * * * *

UNITED STATES PATENT AND TRADEMARK OFFICE
CERTIFICATE OF CORRECTION

PATENT NO. : 4,804,769
DATED : February 14, 1989
INVENTOR(S) : Daniel B. Solarek et al.

Page 1 of 2

It is certified that error appears in the above-identified patent and that said Letters Patent is hereby corrected as shown below:

On the title page

[75] Inventors: Daniel B. Solarek, Somerville; Patrick G. Jobe, Westfield; Martin M. Tessler, Edison; Robert L. Billmers, Stockton; Diane J. Lamb, Bound Brook; John J. Tsai, Belle Mead, all of N.J.

should read

--Martin M. Tessler, Edison; Robert L. Billmers, Stockton; John J. Tsai, Belle Mead, all of N.J.--

At Col. 27, lines 30-41, delete

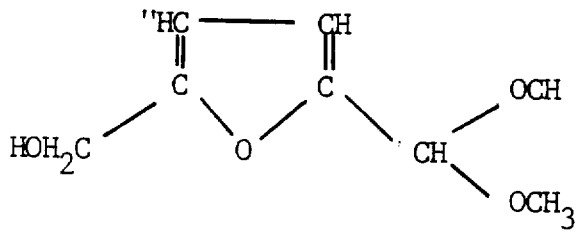

A total of 5.0 g (0.039 mole) of 5-hydroxymethyl furfuraldehyde was dissolved in 150 ml. of anhydrous methanol. The reaction was carried out

UNITED STATES PATENT AND TRADEMARK OFFICE
CERTIFICATE OF CORRECTION

PATENT NO. : 4,804,769

DATED : February 14, 1989

INVENTOR(S) : Daniel B. Solarek et al

It is certified that error appears in the above-identified patent and that said Letters Patent is hereby corrected as shown below:

as above. The resulting red-brown oil was determined by NMR to be 98% acetal. Yield was 100%.

Signed and Sealed this

Tenth Day of April, 1990

Attest:

HARRY F. MANBECK, JR.

*Attesting Officer*  *Commissioner of Patents and Trademarks*